(12) United States Patent
McCormick et al.

(10) Patent No.: US 10,886,795 B2
(45) Date of Patent: Jan. 5, 2021

(54) ELECTRIC MOTOR

(71) Applicant: Hunter Fan Company, Memphis, TN (US)

(72) Inventors: Garrett Patrick McCormick, Manchester, MD (US); Ren Hong Wang, Perry Hall, MD (US)

(73) Assignee: Hunter Fan Company, Memphis, TN (US)

( * ) Notice: Subject to any disclaimer, the term of this patent is extended or adjusted under 35 U.S.C. 154(b) by 114 days.

(21) Appl. No.: 15/822,510

(22) Filed: Nov. 27, 2017

(65) Prior Publication Data

US 2018/0152061 A1    May 31, 2018

Related U.S. Application Data

(60) Provisional application No. 62/428,175, filed on Nov. 30, 2016.

(51) Int. Cl.
| | | |
|---|---|---|
| *H02K 1/16* | (2006.01) | |
| *H02K 3/28* | (2006.01) | |
| *H02K 7/14* | (2006.01) | |

(52) U.S. Cl.
CPC ............. *H02K 1/165* (2013.01); *H02K 3/28* (2013.01); *H02K 7/14* (2013.01)

(58) Field of Classification Search
CPC .. H02K 1/06; H02K 1/08; H02K 1/10; H02K 1/12; H02K 1/14; H02K 1/146; H02K 1/148; H02K 1/16; H02K 1/165; H02K 1/187; H02K 17/14; H02K 3/00; H02K 3/12; H02K 3/16; H02K 3/18; H02K 3/20; H02K 3/28; H02K 3/32; H02K 3/325

USPC ........... 310/187, 216.069, 216.071–216.073
See application file for complete search history.

(56) References Cited

U.S. PATENT DOCUMENTS

| | | | |
|---|---|---|---|
| 4,827,172 A | | 5/1989 | Kobayashi |
| 4,859,895 A | * | 8/1989 | Morishita ............. H02K 1/265 |
| | | | 310/216.069 |
| 8,013,491 B2 | | 9/2011 | Krauth et al. |
| 2010/0181862 A1 | * | 7/2010 | Krauth .................. H02K 1/165 |
| | | | 310/198 |

(Continued)

FOREIGN PATENT DOCUMENTS

| | | |
|---|---|---|
| CN | 202364088 U | 8/2012 |
| CN | 205453322 U | 8/2016 |

(Continued)

OTHER PUBLICATIONS

Iwata, Machine Translation of JP2013187973, Sep. 2013 (Year: 2013).*

(Continued)

*Primary Examiner* — Quyen P Leung
*Assistant Examiner* — Eric Johnson
(74) *Attorney, Agent, or Firm* — McGarry Bair PC

(57) ABSTRACT

A stator comprises multiple, stacked laminations, which collectively define a core having a number of posts arranged circumferentially about the core. Each post extends into two prongs defining a first slot between the prongs. The spacing between each posts and its two prongs defines a second slot having a radially inner and outer slot. The outer slot geometry has an increasing width extending radially outward from the radially inner end, and transitioning to a decreasing width extending to the radially outer end.

19 Claims, 7 Drawing Sheets

(56) References Cited

U.S. PATENT DOCUMENTS

2010/0253174 A1* 10/2010 Yabe .................... H02K 17/205
310/212
2014/0252905 A1* 9/2014 Manfe .................... H02K 19/12
310/162

FOREIGN PATENT DOCUMENTS

| DE | 19838335 A1 | | 3/2000 | | |
|----|-------------|---|--------|---|--------|
| GB | 1066696 A | * | 4/1967 | ............. | H02K 1/165 |
| GB | 1543150 A | * | 3/1979 | ............. | H02K 1/165 |
| JP | 2013187973 A | * | 9/2013 | | |
| JP | 2013187973 A | | 9/2013 | | |
| WO | 2013132775 A1 | | 9/2013 | | |

OTHER PUBLICATIONS

Chinese Patent Office, Office Action re Corresponding Application No. 201711186758.3, Sep. 28, 2020, 7 pages, China.

* cited by examiner

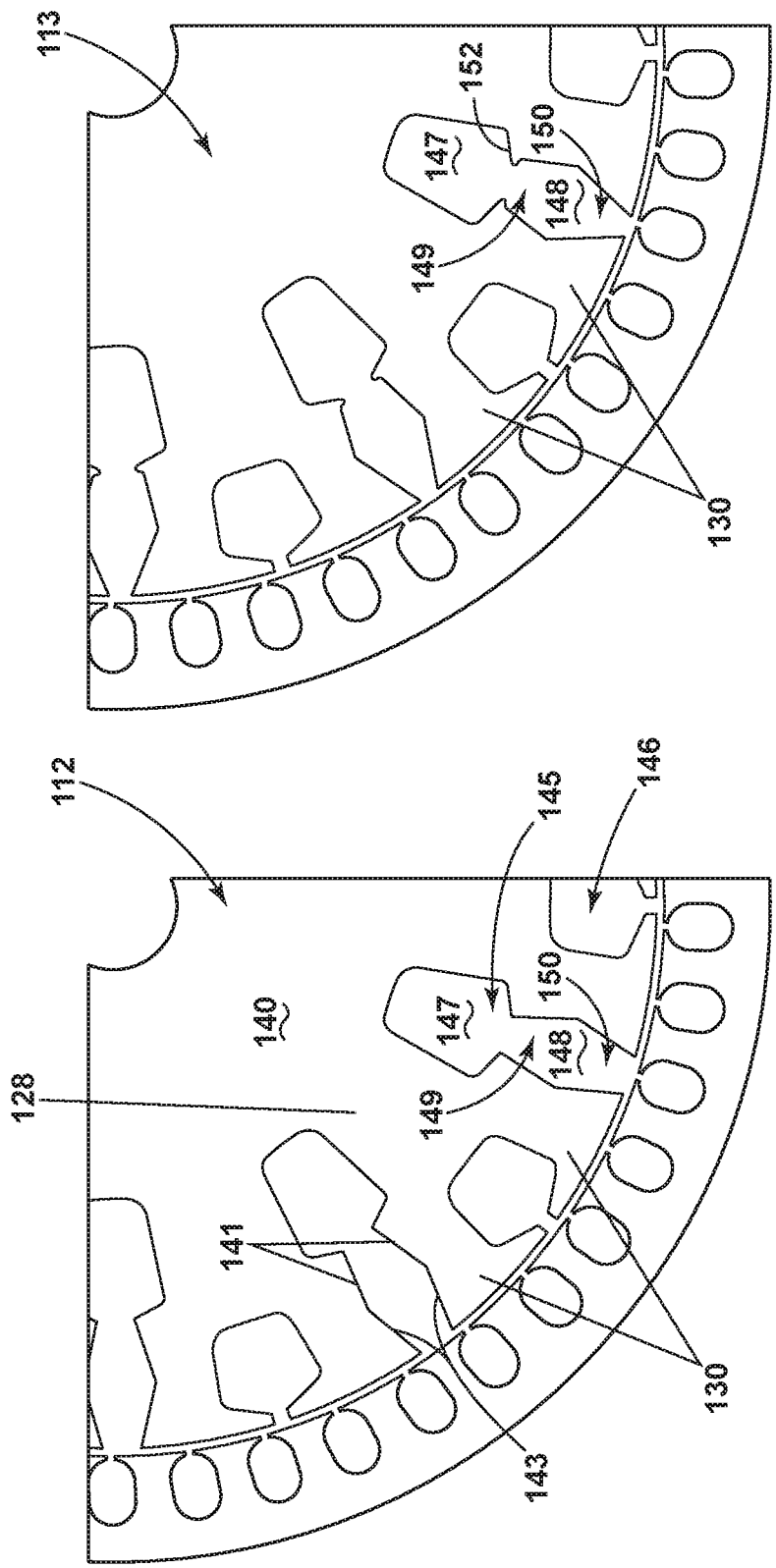

ELECTRIC MOTOR

CROSS-REFERENCE TO RELATED APPLICATION(S)

This application claims priority to U.S. Provisional Patent Application No. 62/428,175, filed Nov. 30, 2016, which is incorporated herein by reference in its entirety.

BACKGROUND OF THE INVENTION

Electric motors comprise a rotor and a stator. The most common arrangement is for the rotor to form the core and the stator to circumscribe the rotor. However, in a ceiling fan environment, it is more common for the stator to form the core and the rotor circumscribe the stator. The stator is commonly made from a plurality of layers of metal, which are commonly referred to as laminations. The laminations may be multiple pieces or a continuous piece arranged in a spiral. The stator forms a plurality of longitudinally-extending winding posts about which wire is wound to form multiple windings. The posts are circumferentially separated to form slots in the core. These slots are circumferentially spaced about the stator.

BRIEF DESCRIPTION OF THE INVENTION

A stator for a distributed coil electric motor for a ceiling fan comprising a cylindrical core having plurality of posts with two prongs arranged circumferentially. A first set of slots is defined between the two prongs from the same post. A second set of slots defined between each adjacent post including an inner winding slot and a flux gap having a width defined in a circumferential direction. The flux gap includes an increasing width and a decreasing width extending to a radially outward direction.

A distributed coil electric motor for a ceiling fan comprising a motors shaft extending in an axial direction. A stator coupled to the motor shaft, having a cylindrical core with plurality of posts with two prongs arranged circumferentially. A first set of slots is defined between the two prongs from the same post. A second set of slots defined between each adjacent post including a winding slot and a flux gap having a width defined in a circumferential direction. The flux gap includes an increasing width and a decreasing width extending to in a radially outward direction. An annular rotor spaced from and surrounding the stator to define an air gap, and including a set of rotor slots. A plurality of coil windings extending between adjacent pairs of the first set of slots and inner winding slot of the second set of slots.

A stator for a concentrated coil electric motor comprising a cylindrical core having plurality of posts with two prongs arranged circumferentially. A first set of slots is defined between the two prongs from the same post. A second set of slots defined between each adjacent post including an inner winding slot and a flux gap having a set of opposing sidewalls extending radially. The set of flux gaps include a variable width extending in the radial direction, with the width increasing radially outward at least along a portion of the slots.

BRIEF DESCRIPTION OF THE DRAWINGS

In the drawings:

FIG. 5A shows an alternative stator lamination having a slot with a linear diverging portion and a linear converging portion.

FIG. 5B shows a variation of the stator lamination of FIG. 5A including a neck portion at a radially inner end.

DESCRIPTION OF EMBODIMENTS OF THE INVENTION

Figure 1:
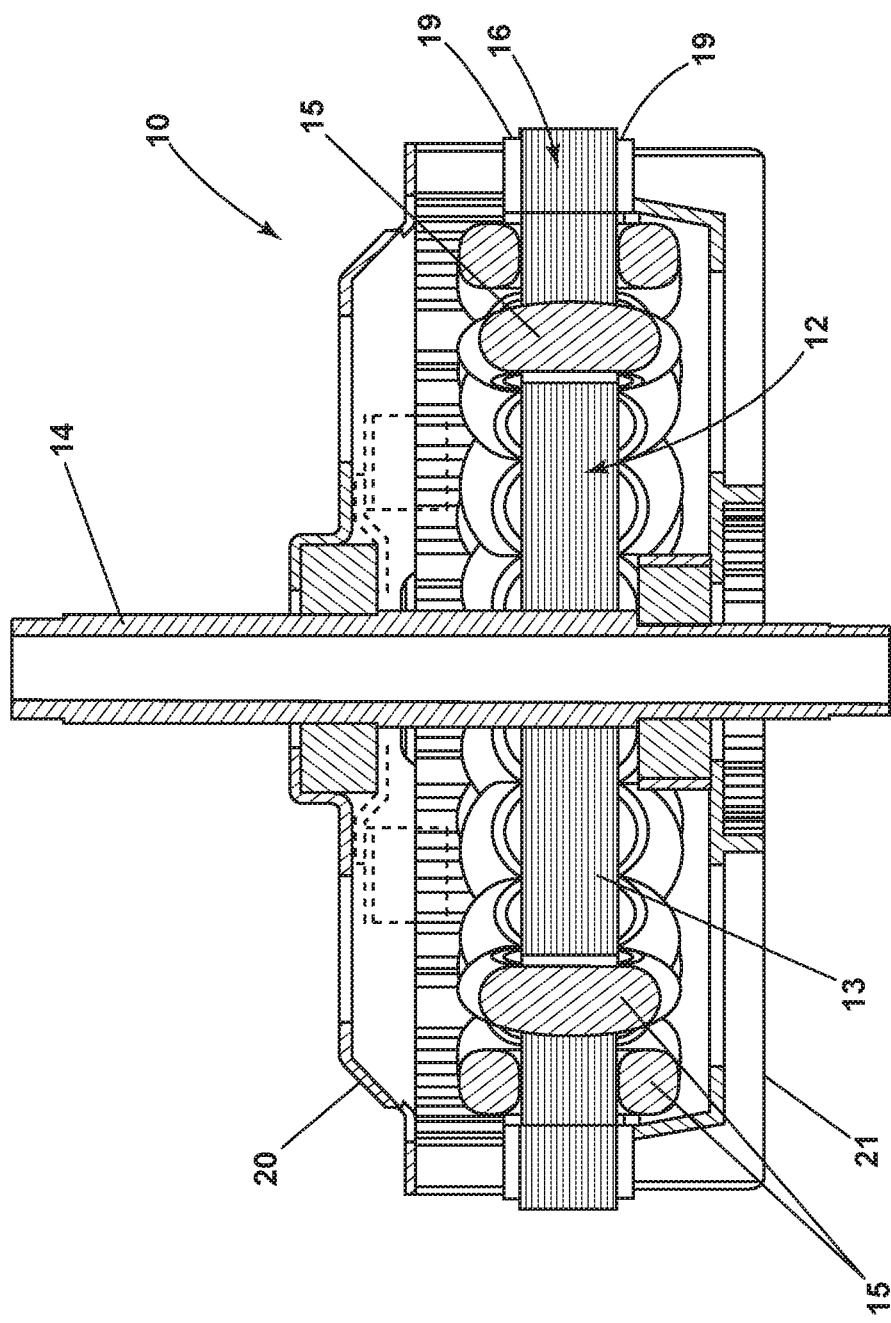
FIG. 1 is a cross-section view of a ceiling fan motor having a stator and a rotor, each with winding posts defining intervening slots.

FIG. 1 shows an electric motor 10 of the type incorporating aspects of the invention in the environment of ceiling fan motors. While shown in the environment of a ceiling fan motor, aspects of the invention have applicability to electric motors regardless of their intended environment. The motor 10 includes a centrally disposed stator 12 fixedly mounted on a stationary stator shaft 14 through a central opening 11. The stator 12 is typically formed from a stack of steel laminations 13 which support motor windings 15. An annular rotor 16 having an inner cylindrically-shaped wall is concentrically positioned about the stator 12. The rotor 16 can also be formed from a stack of steel laminations in a manner similar to the stator. While not illustrated, the rotor 16 laminations are shorted together by a set of conductors (not shown) and a pair of shorting rings 19 at each of their ends. Alternatively, multiple windings can be configured to short the rotor 16 laminations.

The ceiling fan motor 10 includes an upper 20 and lower 21 end covers. End covers 20 and 21 are affixed by any suitable means, such as screws, to the rotor 16 in order to provide connected rotation of the covers 20, 21 with rotor 16 and about stator 12 and shaft 14 during motor operation. During operation, the rotor 16 rotates about the stator 12 and the stator shaft 14 to drive a plurality of fan blades (not shown).

Figure 2:
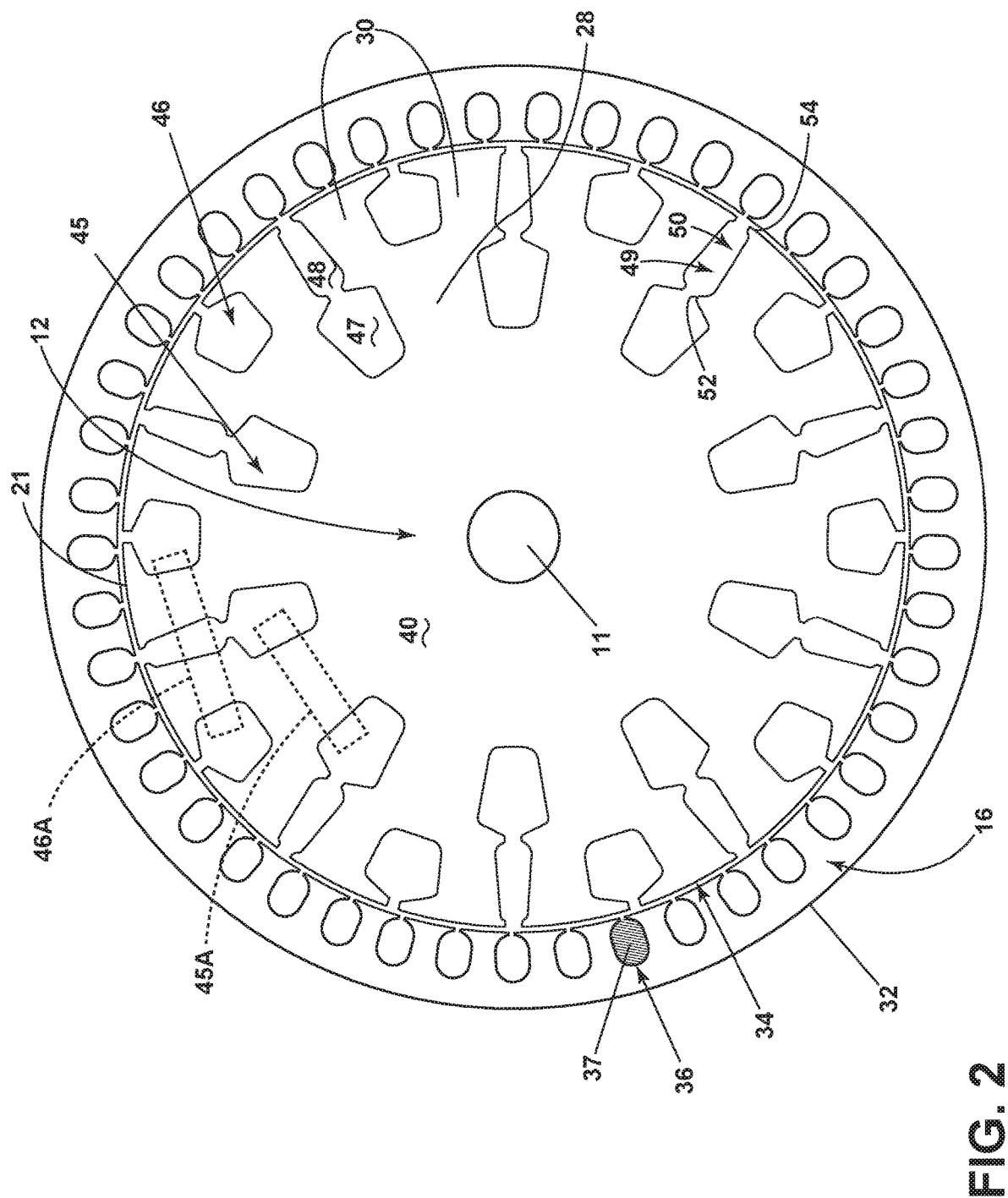
FIG. 2 is a schematic illustration of the stator and rotor, with the windings about the posts removed for clarity to better illustrate the shaped-cross sections of the slots.

Referring to FIG. 2, the rotor 16 can be formed of multiple, stacked rotor laminations 32 spaced from and surrounding the stator 12 to define an air gap 34 between the stator 12 and the rotor 16. The design of the rotor 16 includes a set of rotor slots 36 aligned circumferentially on the inner side adjacent the air gap 34. The rotor slots 36 are filled with plurality of conductors 37 shorted together by a set of shorting rings (not shown) at each of their ends. The conductors and shorting rings (not shown) are formed by diecasting aluminum or copper through the slots 36 and forming a pair of rings on both ends of the rotor slot 36.

Alternatively, a series of windings in the rotor slots 36 can be configured to short the plurality of conductors 37.

The stator 12 can be formed of multiple, stacked laminations 21, which collectively define a core 40 having a number of posts 28 arranged circumferentially about the core 40. Each post 28 extends into two prongs 30 and the spacing between each adjacent post 28 and its two prongs 30 defines a first slot 45 having an inner winding slot 47 and a flux gap 48. The spacing between two prongs 30 of the same post 28 defines a second slot 46. The slots 45 can be thought of as a first set of slots 45 circumferentially spaced about the stator 12 and the slots 46 can be thought of as a second set of slots 46 circumferentially spaced about the stator 12.

The inner winding slot 47 of the first set of slots 45 are sized and shaped to receive and support inner coil windings, schematically illustrated by box 45A, about each post 28. The second set of slots 46 are adapted to receive outer coil windings, schematically illustrated by box 46A, between two adjacent slots 46 extending over two adjacent prongs 30 from different posts 28.

The flux gap 48 includes a first neck portion 52 at the radially inner end 49 and a second neck portion 54 at the radially outer end 50. The first neck portion 52 provides an anchor point for positioning insulators at the inner coil winding slots 47 to prevent sliding of a coil winding about the post 28.

Figure 3:
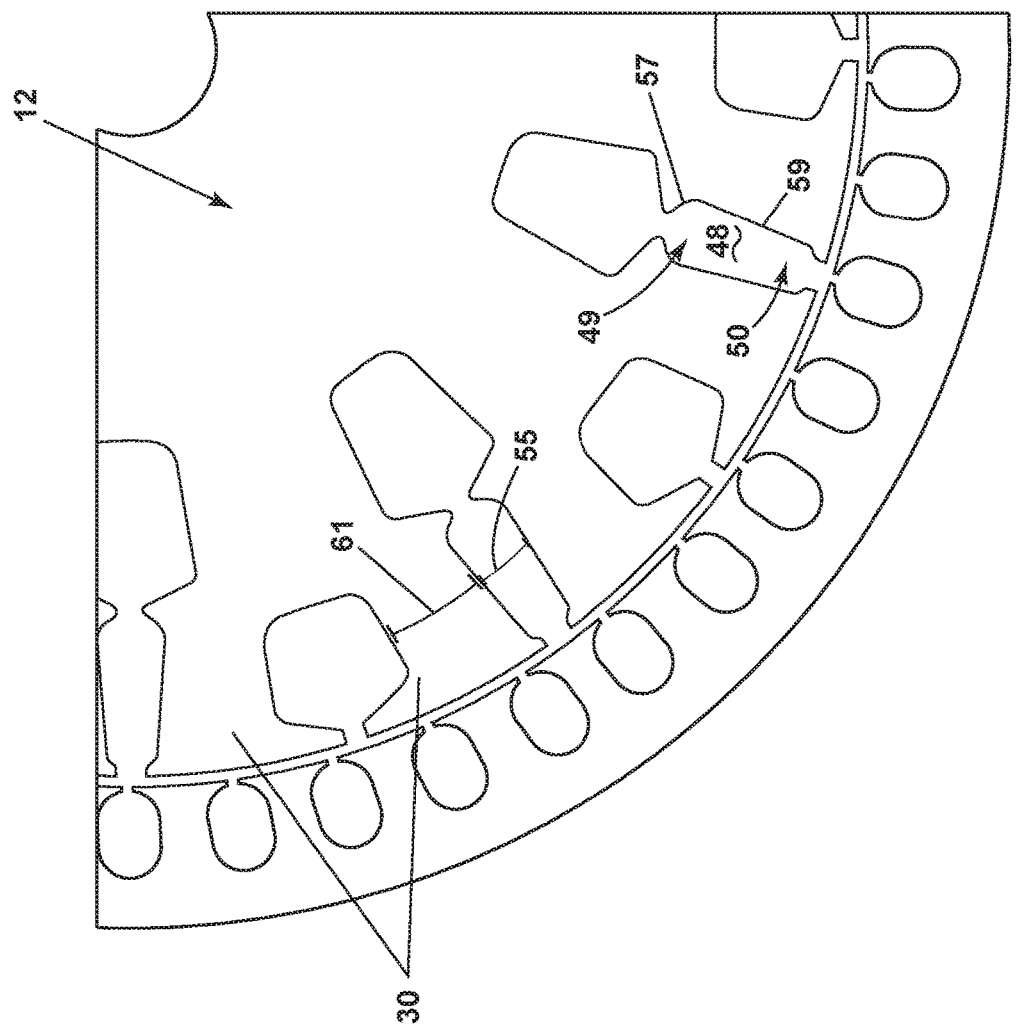
FIG. 3 is a close-up view of the geometry of the shape cross sections of the slots of FIG. 2.

Referring to FIG. 3, illustrating an exemplary quadrant of the stator 12 of FIG. 2, the flux gap 48 includes a width 55 defined in the circumferential direction. The geometry of flux gap 48 includes a diverging portion 57 extending radially outwardly from the inner end 49, transitioning into a converging portion 59 terminating at the outer end 50. The diverging portion 57 can be defined as having an increasing value for the width 55 of the flux gap 48 extending radially outwardly, while the converging portion can be defined as having a decreasing value for the width 55 of the flux gap 48 extending radially outwardly. While shown that the diverging portion 57 extends for a radial length less than the converging portion 59, it should be understood that this is exemplary, and the converging and diverging portions can extend for any portion of the flux gap 48.

Figure 4A:
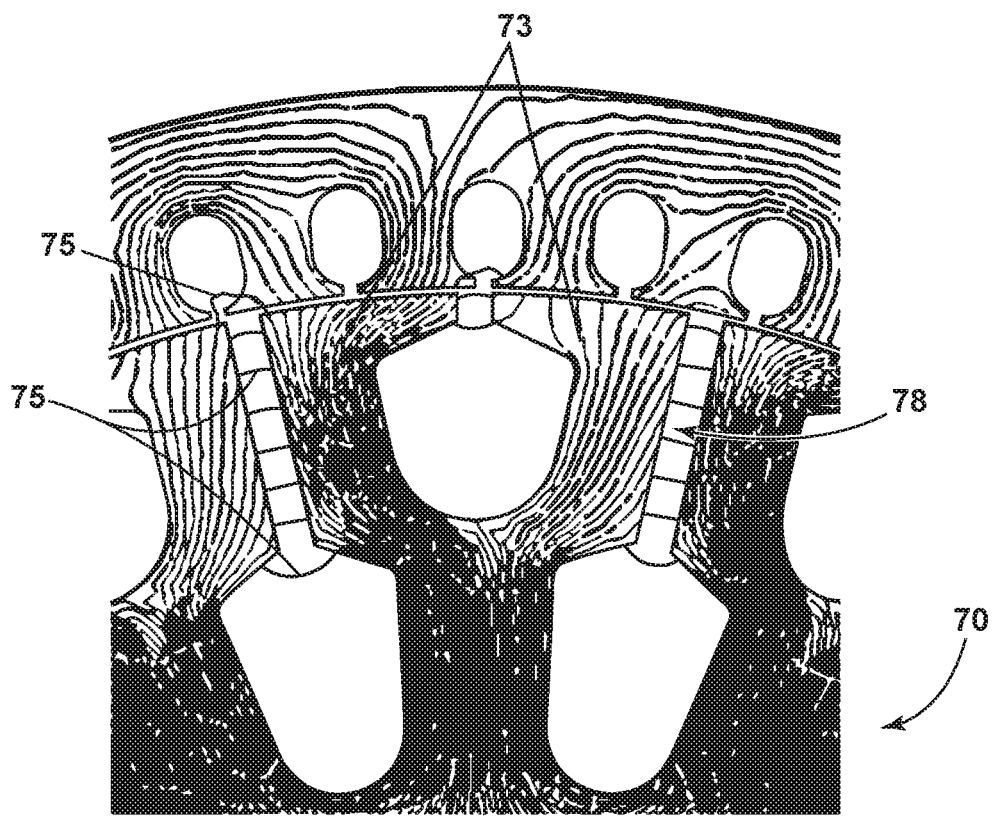
FIG. 4A shows an illustration of the flux paths about the posts of a typical prior art stator.
Figure 4B:
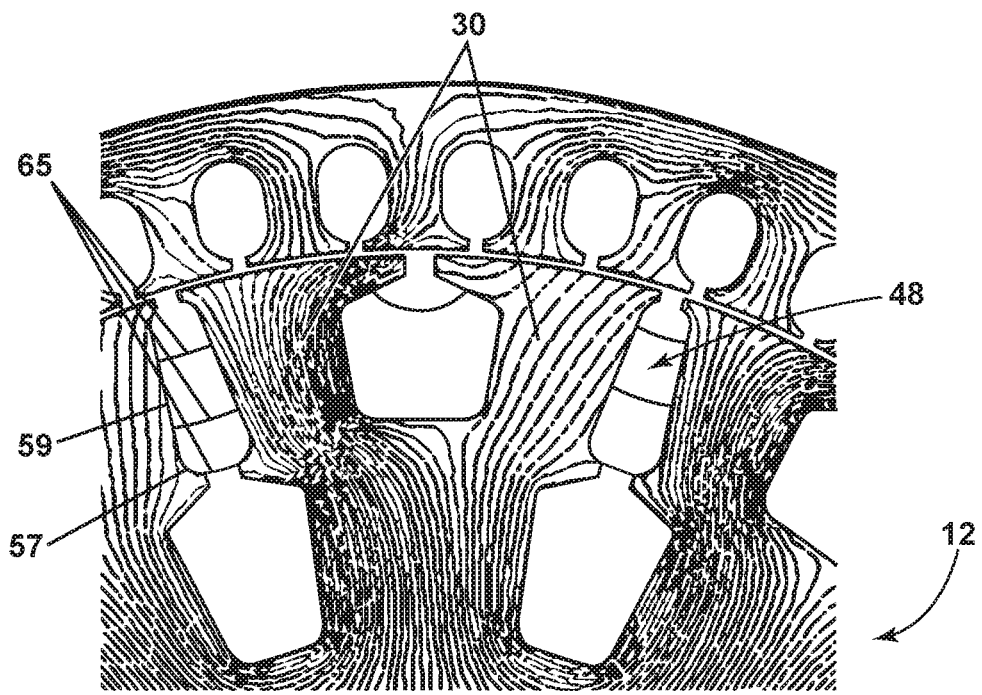
FIG. 4B shows an illustration of the flux paths about the posts of the stator of FIGS. 2 and 3, according to various aspects described herein.

Additionally, each prong 30 can also have a width 61 defined in the circumferential direction. The width 61 of each prong 30 can be variable extending in the radially outward direction depending on the geometry of the flux gap 48. For example, as shown, the converging portion 59 of the flux gap 48 defines an increasing width 61 for the prong 30 extending radially outwardly. However, it is contemplated that the width 61, can be increasing, decreasing, variable, or any combination thereof, as well as constant for a portion of the prong 30, in non-limiting examples. An illustration of simulated magnetic flux lines of a conventional stator 70 used in a typical ceiling fan motor is shown in FIG. 4A. A flux gap 78 in the typical stator 70 includes a constant width extending in the radial direction, unlike the diverging/converging portions 57/59. The proximity and linearity between the prongs 73 defining the flux gap 78 resulted in substantial fringing of leakage flux 75 from the inner windings about a post. Fringing flux is the spreading of flux lines in an air gap of a magnetic circuit which is a common cause of electromagnetic disturbances. FIG. 4B, illustrates the flux lines of a stator with the flux gap 48 of FIGS. 2 and 3 under the same conditions of FIG. 4A. In comparing FIG. 4B to FIG. 4A, it can be seen that, the flux lines for the flux gap 48 have reduce fringing of leakage flux 65. The design of the flux gap 48 shown in FIG. 4B decreases the flux leakage by an order of 2-4 times over a conventional linear flux gap 78 and decreases the overall impedance associated with the combination of all the sources of flux leakage by at least 15%.

The reduced fringing is attributable to the increasing width of the diverging portion 57 of the flux gap 48, which increases magnetic reluctance in the radial direction across the set of prongs 30 resulting in a lower fringing of leakage flux 65. The transition to a decreasing width of the converging portion 59 of the flux gap 48 results in the increasing width of the prongs 30 as they extend radially outward. The increasing width of the prongs 30 prevents the formation of choke points for the magnetic flux passing through the prongs 30 on either side of the flux gap 48.

Another exemplary stator is illustrated in FIG. 5A. FIG. 5A is substantially similar to that of FIG. 3, with numerals being increased by a value of one hundred, and that the discussion will be limited to differences among the two. A stator 112 with similar structure to the first example includes a number of posts 128 with prongs 130 arranged circumferentially about a core 140 having a first 145 and second 146 set of slots. The stator 112 differs in that the set of flux gaps 148 have a diverging portion 141 and converging portion 143 that are both defined by linear walls of the flux gap 148. The diverging portion 141 extends radially outward from the radially inner end 149 across half of the length of the flux gap 148, and transitioning to a converging portion 143 extending to a radially outer end 150. While it is illustrated in FIG. 5A that the diverging 141 and converging 143 portions each define half of the flux gap 148 extending in the radial direction, it should be understood that the diverging 141 and converging 143 portions can be any percentage, such as 60% of the radial length and 40% of the radial length, respectively. This flux gap 148 geometry retains the increase in magnetic reluctance radially across half the length of the set of prongs 130 resulting in a lower leakage flux and fringing flux. As the radially outer end 150 of the flux gap 148 transitions to a converging portion 143, the width of the prongs 130 increases on either side of the flux gap 148 near the outer end 150. The increasing width along the prongs 130 prevents the formation of choke points for magnetic flux to pass through.

Referring to FIG. 5B, an alternative stator 113 variation of FIG. 5A includes a first neck portion 152 at the radially inner end 149 to provide an anchor point for positioning insulators at the inner winding slots 147. While it is illustrated that the outer end 150 of the flux gap 148 can be tapered slightly to further increase the width of the prongs 130 as they extend radially outward, the prongs 130 can be configured to have variable width to control the density of the flux passing through the prongs 130.

Figure 6B:
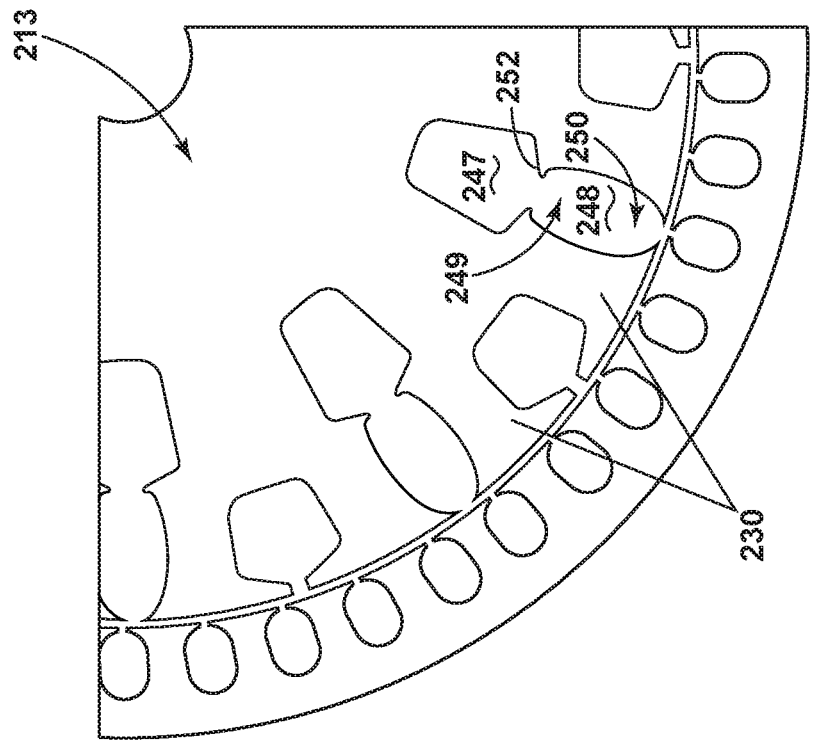
FIG. 6B shows a variation of the stator lamination of FIG. 6A with a neck portion at a radially inner end.
Figure 6A:
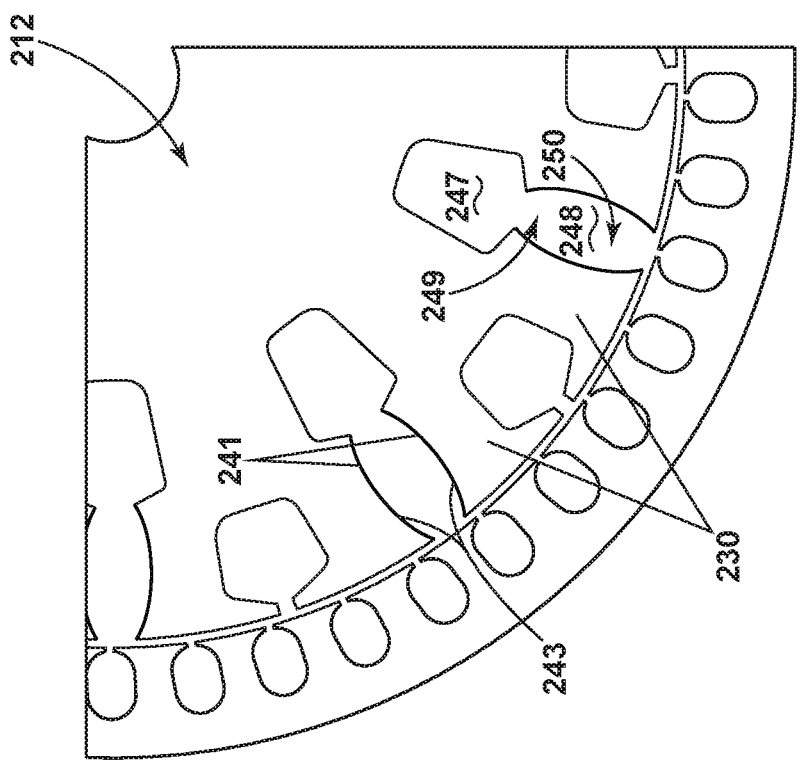
FIG. 6A shows another alternative stator lamination including a non-linear diverging portion and a non-linear converging portion.

A fourth exemplary stator 212 is illustrated in FIG. 6A showing a non-linear geometry for a set of flux gaps 248. FIG. 6A can be substantially similar to FIG. 3, with it being understood that like parts will be described by like numerals increased by a value of two hundred.

Referring to FIG. 6A, the stator 212 comprises of the same basic structure according to the first exemplary stator except for the flux gap 248 having a diverging 241 and converging 243 portion that are both non-linear. The transition between the diverging and converging portions 241, 243 of the flux gap 248 is gradual across the length of the gap 248, defining an arcuate profile having a substantially oval shape coupling the inner winding slot 247 to the flux gap 248. While it is illustrated that the flux gaps 248 are symmetrical about a circumferential center, radial axis, or both, they can vary to form unique non-linear shapes. For example, they can be combined with the slot geometry described in FIGS. 5A and 5B to form combined non-linear and linear shapes having a convex profile along at least a portion of the slot. Such slot geometry can retain the increase in magnetic reluctance radially along the set of prongs 230 resulting in a lower leakage flux and fringing flux. The increasing width of the prongs 230 on either side of the flux gap 248 near the outer end 250 prevents the formation of choke points for magnetic flux to pass through. By utilizing a combination of geometries, or varying geometries based upon the design of the motor, the leakage flux and fringing flux can be lowered for the particular motor. The geometry of the gap 248 can be adapted to the particular motor to improve efficiency.

As shown in FIG. 6B, an alternative stator 213 variation of FIG. 6A can also be configured to include a first neck portion 252 at the radially inner end 249 to provide an anchor point for positioning insulators at the inner winding slots 247. The prongs 230 and the flux gaps 248 can also be configured to have variable width extending from the first neck 252 portion to control the density of the flux passing through the prongs 230.

Figure 7A:
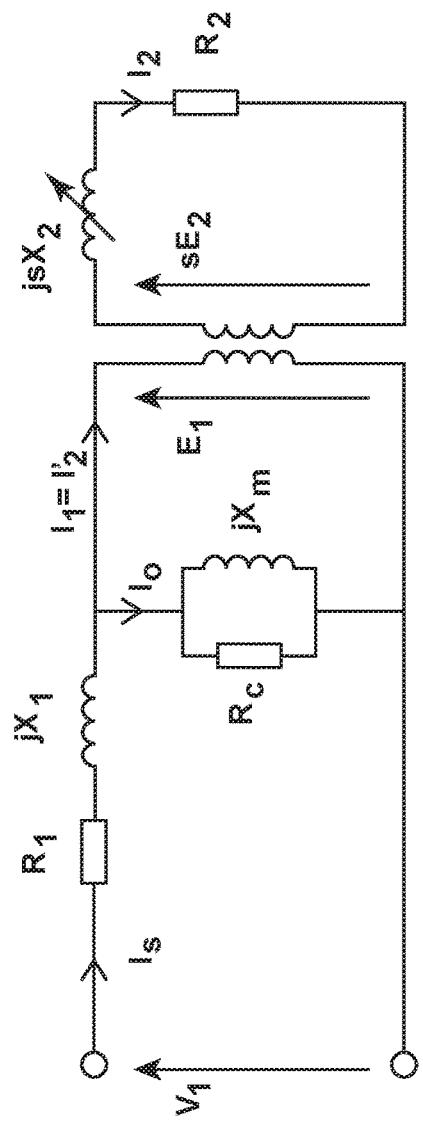
FIG. 7A is the equivalent circuit representing the interaction between a stator and a rotor of a typical induction motor.
Figure 7B:
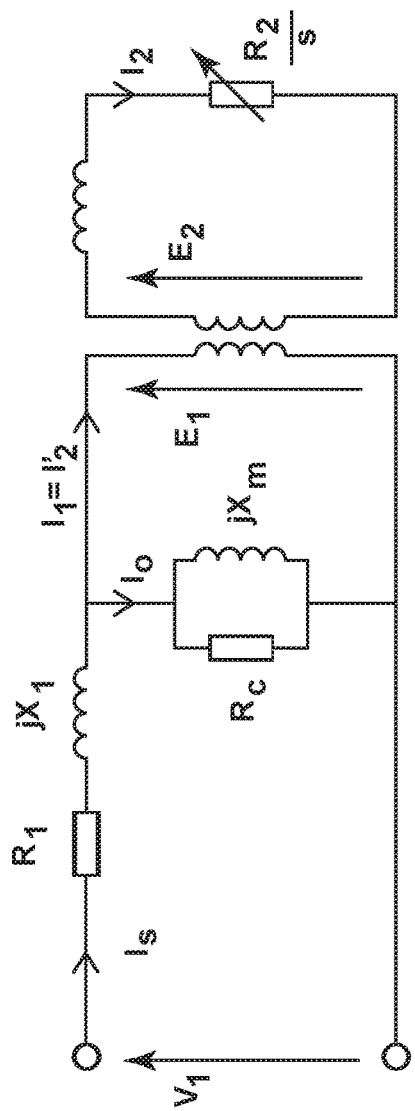
FIG. 7B is a derivation of the equivalent circuit of diagram FIG. 7A representative of the improvement appreciated with the improved stator lamination design in accordance with various aspects described herein.

Referring to FIGS. 7A and 7B, two circuit diagrams are illustrated depicting the benefit appreciated with the geometry of the flux gaps 48 as shown in FIGS. 3 and 4. It should be appreciated, however, that such benefits are appreciable with the alternative variable geometries of the remaining stators as described herein.

Referring to FIG. 7A, a circuit diagram of representing the stator 12 (FIG. 2) and rotor 16 (FIG. 2) interaction is shown. The various parameters shown in the circuit have the following meanings:

R1 is the resistance of the stator windings.

X1 is the impedance associated with the flux leakage in the stator 12 that prevents flux from crossing the stator-rotor air gap 34 (FIG. 2). The flux that leaks across the flux gaps 48 (FIG. 2) in the stator also contributes to the overall flux leakage.

Io is the current associated with magnetizing the stator.

Rc is the resistance representing core loses such as eddy current and hysteresis losses.

Xm is the magnetizing reactance required to have the flux cross the stator-rotor air gap. [0039] s is the difference between the synchronous speed of the magnetic field and the shaft rotating speed known as motor slip.

R2 is the resistance associated to the rotor.

X2 is the magnetizing reactance associated to the rotor.

E1 is the electromagnetic force (EMF) created by the stator windings.

E2 is the electromagnetic force (EMF) induced on the rotor by E1.

I2 is the current associated to the rotor.

The air gap 34 between the stator 12 and rotor 16 is represented as a transformer. The EMF E1 created on the stator 12 by the windings induce an EMF E2 on the rotor 16. The induction of EMF is affected by the slip s. As the rotor 16 increases in speed, the value of the slip s drops and the induced EMF E2 will also drop. Consequentially, the rotor's 16 reactance X2 will vary with speed and is expressed as a variable dependent on the slip s. From the equivalent circuit, I2 can then be expressed by the following equation:

$$I2=(s \cdot E2)/\sqrt{((R2)^2+(s \cdot X2)^2)} \quad (1)$$

By examining the factors that influenced the current I2, the circuit can be manipulated to the equivalent form shown in FIG. 7B. I2 can be rewritten as the follow equation:

$$I2=(E2)/\sqrt{((R2/s)^2+(X2)^2)} \quad (2)$$

In this form, the rotor 16 resistance R2 is modified in inverse proportion to the slip s. As the rotor 16 speeds up, the value of slip s drops and the effective resistance R2 in the rotor 16 increases.

Based on the present invention, increasing the magnetic reluctance in the electric motor 10 can be done by reducing flux leakage at the flux gaps 48 with a diverging portion and a converging portion extending radially outwardly along the stator 12. By widening the geometry of the flux gaps 48 (FIG. 2) of the stator 12, the magnetic reluctance across the flux gaps 48 increases, reducing the flux leakage from the flux gaps 48. The reduced flux leakage reduces the stator 12 impedance X1 by 15% resulting in the increase of current I1 that strengthens the magnetic flux extending radially outside of the stator 12. The increase in the current I1 on the stator 12 side creates a stronger EMF E1 which induce a stronger EMF E2 on the rotor 16 side resulting in the increase of the rotor's 16 current I2. The induced current I2 in the rotor 16 will directly effects the amount of torque generated by the rotor 16. In order to maximize this benefit, the rotor 16 resistance R2 needs to be reduced by increasing the cross-sectional area of the rotor slots 36 and the conductors 37 (FIG. 2) through the rotor laminations 32. Alternatively, it could also be accomplished by using lower resistivity material for the rotor conductors 37 and shorting rings 19, such as using copper instead of aluminum.

The unique design of the slot geometry according to the various aspects described herein increases the magnetic reluctance laterally across the stator flux gaps 48 resulting in lower leakage flux and fringing flux across the slots. The increase in magnetic reluctance across the flux gaps 48 increases the magnetic flux extending radially through the air gap 34 which improves the efficiency of the electric motor 10. Such improvements can improve the overall efficiency of the motor.

A method of increasing magnetic reluctance in an electric motor having a rotor and a stator can include (1) reducing flux leakage at a flux gap with a diverging portion and a converging portion extending radially outwardly along the stator. The diverging portion and the converging portion can be similar to those described herein. See, for example, FIGS. 5A and 5B, a diverging and converging portion 141, 143. Such an organization for the flux gap can decrease overall impedance by 15% or more, in one example.

Additionally, the converging portion and the diverging portion can increase magnetic reluctance across the flux gap and increase magnetic flux extending radially outwardly from the stator.

It should be appreciated that increasing the magnetic flux extending radially outwardly from the stator can improve torque of the rotor at the same power drawn by the motor, improving efficiency of the fan by minimizing flux leakage.

Although the embodiment of the present invention have been shown and described, it would be appreciated by those skilled in the art that changes may be made in these embodiments without departing from the principles and spirit of the invention. Although specific terms are employed herein, they are used in a generic and descriptive sense only and not for purposes of limitation.

What is claimed is:

1. A stator for an electric motor for a ceiling fan, the stator comprising:
    a core having a plurality of posts arranged circumferentially about the core;
    wherein each post of the plurality of post include a set of prongs, and where the plurality of posts collectively define a first set of slots, with each slot of the first set of slots located between each two adjacent posts of the plurality of posts and including an inner winding slot and a flux gap in communication with the inner winding slot and provided radially outside of the inner winding slot, wherein the flux gap includes a non-linear diverging portion that has a radial length of 60% of the flux gap and a non-linear converging portion that has a radial length of 40% of the flux gap located radially outward of the diverging portion;

a first neck provided at a radially inner end of the flux gap and defining a first opening; and a second neck provided at a radially outer end of the flux gap, opposite the first neck, and the second neck defining a second opening; and wherein the diverging portion and the converging portion have a substantially oval shape located between the first neck and the second neck.

2. The stator of claim 1 wherein the first neck forms a junction between the winding slot and the flux gap.

3. The stator of claim 1 wherein the first neck provides an anchor point for positioning insulators at the inner winding slot to prevent sliding of a coil winding extending between two of the inner winding slots.

4. The stator of claim 1 wherein a width of the prongs varies in a radial direction relative to the core.

5. The stator of claim 4 wherein the width of the set of prongs increases extending radially outwardly relative to the core.

6. The stator of claim 4 further comprising a second slot defined between the set of prongs from the same post, which collectively form a second set of slots.

7. The stator of claim 6 wherein the first set of slots includes eight to twelve slots and the second set of slots includes eight to twelve slots.

8. The stator of claim 1 wherein a transition between the diverging portion and the converging portion across a radial length of the flux gap defines an arcuate profile.

9. An electric motor for a ceiling fan comprising:
a motor shaft extending in an axial direction;
a stator coupled to the motor shaft, having a core with a central opening receiving the motor shaft, and plurality of posts arranged circumferentially about the core, the stator including a slot defined between adjacent posts, to define a set of slots, wherein each post of the plurality of posts include a set of prongs, and each slot including a winding slot and a flux gap, which is in communication with the winding slot and provided radially outside of the winding slot relative to the central opening;
a first neck provided at a radially inner end of the flux gap and defining a first opening; and
a second neck provided at a radially outer end of the flux gap, opposite the first neck, and the second neck defining a second opening;
wherein the flux gap includes a diverging portion that has a radial length 60% of the flux gap and a converging portion that has a radial length 40% of the flux gap, the diverging portion and converging portion having a substantially oval shape located between the first neck and the second neck.

10. The electric motor of claim 9 further comprising:
a plurality of coil windings wound about the winding slots and extending between adjacent pairs of slots;
wherein the first neck provides an anchor point for positioning insulators to prevent sliding of the plurality of coil windings.

11. The stator of claim 10 wherein a width of the prongs increases radially outwardly.

12. A stator for an electric motor comprising:
a core with a central opening and having plurality of circumferentially arranged posts, each post having two spaced prongs;
a slot defined between adjacent posts to collectively define a set of slots, the slot including an inner winding slot and a flux gap in communication with the inner winding slot and provided radially outside of the inner winding slot relative to the central opening, wherein the flux gap has a set of opposing sidewalls which diverge to define a diverging portion that has a radial length 60% of the flux gap and then converge to define a converging portion that has a radial length 40% of the flux gap;
a first neck provided at a radially inner end of the flux gap and defining a first opening; and
a second neck provided at a radially outer end of the flux gap, opposite the first neck, and the second neck defining a second opening;
wherein the diverging portion and the converging portion have a substantially oval shape located between the first neck and the second neck.

13. The stator of claim 12 wherein the set of opposing sidewalls are nonlinear.

14. The stator of claim 13 wherein the set of opposing sidewalls are concave relative to the flux gap along the radial length of the flux gap.

15. The stator of claim 14 wherein sidewalls define a radius of curvature and a local radius of curvature increases extending radially outward.

16. The stator of claim 13 wherein the set of opposing sidewalls are convex along at least a portion of the flux gap.

17. The stator of claim 12 wherein at least a portion of the opposing sidewalls are linear.

18. The stator of claim 12 wherein the converging portion is positioned radially outside of the diverging portion.

19. The stator of claim 12 wherein the set of opposing sidewalls are both linear and non-linear.

* * * * *